US009251596B2

(12) United States Patent
Rueckert et al.

(10) Patent No.: US 9,251,596 B2
(45) Date of Patent: Feb. 2, 2016

(54) METHOD AND APPARATUS FOR PROCESSING MEDICAL IMAGES

(75) Inventors: Jan Paul Daniel Rueckert, London (GB); Robin Wolz, London (GB); Paul Ajabar, Reading (GB)

(73) Assignee: Imperial Innovations Limited, London (GB)

( * ) Notice: Subject to any disclaimer, the term of this patent is extended or adjusted under 35 U.S.C. 154(b) by 350 days.

(21) Appl. No.: 13/497,818

(22) PCT Filed: Sep. 30, 2010

(86) PCT No.: PCT/GB2010/001844
§ 371 (c)(1),
(2), (4) Date: Jul. 25, 2012

(87) PCT Pub. No.: WO2011/039515
PCT Pub. Date: Apr. 7, 2011

(65) Prior Publication Data
US 2012/0281900 A1  Nov. 8, 2012

(30) Foreign Application Priority Data

Sep. 30, 2009  (GB) .................................. 0917154.7

(51) Int. Cl.
*G06T 7/00* (2006.01)
*G06K 9/46* (2006.01)
*G06K 9/62* (2006.01)

(52) U.S. Cl.
CPC ............. *G06T 7/0089* (2013.01); *G06K 9/468* (2013.01); *G06K 9/6252* (2013.01); *G06T 7/0081* (2013.01); *G06T 2207/10088* (2013.01);
(Continued)

(58) Field of Classification Search
CPC ............................................ G06T 2207/20128
USPC .................................................. 382/128, 131
See application file for complete search history.

(56) References Cited

U.S. PATENT DOCUMENTS

2007/0053589 A1  3/2007 Gering
2008/0154118 A1  6/2008 Dale et al.

FOREIGN PATENT DOCUMENTS

GB  WO 2005101299 A2 * 10/2005 ........... G06K 9/6212
WO  WO 2005101299 A2 * 10/2005
(Continued)

OTHER PUBLICATIONS

Lijn et al., "Hippocampus Segmentation in MR Images using Atlas Registration, Voxel, Classification, and Graph Cuts", 2008, NeuroImage, 43, pp. 708-720.*

(Continued)

*Primary Examiner* — Vu Le
*Assistant Examiner* — Kenny Cese
(74) *Attorney, Agent, or Firm* — Hickman Palermo Becker Bingham LLP

(57) ABSTRACT

The present invention provides, among other things, methods of processing medical images for producing images with labeled anatomical features, including obtaining images containing labeled anatomical features, obtaining unlabelled images, comparing and selecting unlabelled images that most closely resemble labeled images, and propagating label data from labeled images to unlabelled images, thereby labeling corresponding anatomical features on unlabelled images. The present invention also provides systems for performing such methods.

20 Claims, 6 Drawing Sheets (1) Embed images   (2) Select images for propagation (3) Register atlases  (4) Propagate labels and refine  (5) Iterate (2) - (4)

(52) U.S. Cl.
CPC .......... G06T2207/20128 (2013.01); G06T 2207/30016 (2013.01)

(56) References Cited

FOREIGN PATENT DOCUMENTS

| WO | WO-2009/093146 A1 | 7/2009 |
|---|---|---|
| WO | WO2011/039515 A1 | 4/2011 |

OTHER PUBLICATIONS

Heckemann et al., "Automatic Anatomical Brain MRI Segmentation Combining Propagation and Decision Fusion", 2006, Neuroimage, 33, pp. 115-126.*
Aljabar, P. et al., "Automated morphological analysis of magnetic resonance brain imaging using spectral analysis," NeuroImage 43: 225-235, 2008.
Aljabar, P. et al., "Multi-atlas based segmentation of brain images: Atlas selection and its effect on accuracy," NeuroImage 46: 726-738, 2009.
Aljabar, P. et al., "Tracking longitudinal change using MR image data," Chapter 1: 15-25, 2007.
Bhatia, K. et al., "Similarity Metrics for Groupwise Non-rigid Registration," MICCAI 4792: 544-552, 2007.
International Search Report for PCT/GB2010/001844 mailed Dec. 30, 2010.
Wolz, R. et al., "Segmentation of Subcortical Structures and the Hippocampus in Brain MRI Using Graph-Cuts and Subject-Specific A-Priori Information," Biomedical Imaging, 470-473, 2009.
Written Opinion for PCT/GB2010/001844 mailed Dec. 30, 2010.
Avants, B. and Gee, J.C., Geoesic estimation for large deformation anatomical shape averagin and interpolation, NeuroImage, 23:S139-S150 (2004).
Bajcsy, R. et al., A Computerized System for the Elastic Matching of Deformed Radiographic Images to Idealized Atlas Images, Journal of Computer Assisted Tomography, 7(4):618-625 (1983).
Blezek, D.J. and Miller, J.V., Atlas stratification, Medical Image Analysis, 11:443-457 (2007).
Chupin, M. et al., Automatic segmentation of the hippocampus and the amygdala driven by hybrid constraints: Method and validation, NeuroImage, 46:749-761 (2009).
Collins, D.L. et al., Automatic 3-D Model-Based Neuroanatomical Segmentation, Human Brain Mapping, 3:190-208 (1995).
Davis, B.C. et al., Population Shape Regression From Random Design Data, 11th IEEE International Conference on Computer Vision, 1-7 (2007).
Dice, L.R., Measures of the Amount of Ecologic Association Between Species, Ecology, 26(3):297-302 (1945).
Ericsson, A. et al., Construction of a Patient-Specific Atlas of the Brain: Application to Normal Aging, Imperial College: Department of Computing, IEEE 480-483 (2008).
Gee, J.C. et al., Elastically Deforming 3D Atlas to Match Anatomical Brain Images, Journal of Computer Assisted Tomography, 17(2):225-236 (1993).
Hammers, A. et al., Automatic detection and quantification of hippocampal atrophy on MRI in temporal lobe epilepsy: A proof-of-principle study, NeuroImage, 36:38-47 (2007).
Hammers, A. et al., Three-Dimensional Maximum Probability Atlas of the Human Brain, With Particular Reference to the Temporal Lobe, Human Brain Mapping, 19:224-247 (2003).
Jack, C.R. Jr. et al., Prediction of AD with MRI-based hippocampal volume in mild cognitive impairment, Neurology, 52:1397-1407 (1999).
Joshi, S. et al., Unbiased diffeomorphic atlas construction for computational anatomy, NeuroImage, 23:151-160 (2004).
Mazziotta, J.C. et al., A Probabilistic Atlas of the Human Brain: Theory and Rationale for Its Development, NeuroImage, 2:89-101 (1995).
Morra, J.H. et al., Validation of a fully automated 3D hippocampal segmentation method using subjects with Alzheimer's disease mild cognitive impairment, and elderly controls, NeuroImage, 43:59-68 (2008).
Niemann, K. et al., Evidence of a smaller left hippocampus and left temporal horn in both patients with first episode schizophrenia and normal control subjects, Psychiatry Research: Neuroimaging Section, 99:93-110 (2000).
Reiman, E.M. et al., Hippocampal Volumes in Cognitively Normal Persons at Genetic Risk for Alzheimer's Disease, Annals of Neurology. 44(2):288-291 (1998).
Rohlfing, T. et al., Performance-Based Classifer Combination in Atlas-Based Image Segmentation Using Expectation-Maximization Parameter Estimation, IEEE Transactions on Medical Imaging, 23(8):983-994 (2004).
Rueckert, D. et al., Nonrigid Registration Using Free-Form Deformations: Application to Breast MR Images, IEEE Transactions on Medical Imaging, 18(8):712-721 (1999).
Sabuncu, M.R. et al., Discovering Modes of an Image Population through Mixture Modeling, MICCAI, 2(LNCS5242):381-389 (2008).
Shrout, P.E. and Fleiss, J.L., Intraclass Correlations: Uses in Assessing Rater Reliability, Psychological Bulletin, 86(2):420-428 (1979).
Studholme, C. et al., An overlap invariant entropy measure of 3D medical image alignment, Pattern Recognition, 32:71-86 (1999).
Tang, S. et al., RABBIT: Rapid Alignment of Brains by Building Intermediate Templates, Proc. of SPIE 7259(725909):1-8 (2009).
Van Rikxoort, E.M. et al., Adaptive Local Multi-Atlas Segmentation: Application to Heart Segmentation in Chest CT Scans, Proc. of SPIE, 6914:(691407)1-6 (2008).
Von Luxburg, U., A Tutorial on Spectral Clustering, Statistics and Computing 17(4):1-32 (2007).
Warfield, S.K. et al., Simultaneous Truth and Performance Level Estimation (STAPLE): An Algorithm for the Validation of Image Segmentation, IEEE Transactions on Medical Imaging, 23(7):903-921 (2004).
Wu, M. et al., Optimum template selection for atlas-based segmentation, NeuroImage, 34:1612-1618 (2007).

* cited by examiner (a) Transverse  (b) Coronal  (c) Sagittal (a) MRI  (b) direct  (c) direct, GC
(d) LEAP, no GC  (e) LEAP  (f) manual

METHOD AND APPARATUS FOR PROCESSING MEDICAL IMAGES

This invention relates to a method and corresponding apparatus for processing medical images. It is particularly suitable, but by no means limited, for processing magnetic resonance images, for example of the human brain.

BACKGROUND TO THE INVENTION

The automated extraction of features from magnetic resonance images (MRI) of the brain is an increasingly important process in neuroimaging. Since the brain anatomy varies significantly across subjects and can undergo significant change, either during aging or through disease progression, finding an appropriate way of dealing with anatomical differences during feature extraction has gained increasing attention in recent years.

Amongst the most popular methods for dealing with this variability are atlas-based approaches. In the context of the present work, an "atlas" is a dataset (which may be a 3D image, a 2D image, images of any dimension, or a set of images) having annotations or labels in order to identify points, regions or structures within the image.

Atlas-based approaches assume that the atlases can encode the anatomical variability either in a probabilistic or statistical fashion. When building representative atlases, it is important to register all images to a template that is unbiased towards any particular subgroup of the population. Two approaches using the large deformation diffeomorphic setting for shape averaging and atlas construction have been proposed by Avants and Gee (2004) and Joshi et al. (2004). Template-free methods for co-registering images form an established framework for spatial image normalization. In a departure from approaches that seek a single representative average atlas, two more recent methods describe ways of identifying the modes of different populations in an image dataset (Blezek and Miller, 2007; Sabuncu et al., 2008).

To design variable atlases dependent on subject information, a variety of approaches have been applied in recent years to the problem of characterizing anatomical changes in brain shape over time and during disease progression. Davis et al. (2007) describe a method for population shape regression in which kernel regression is adapted to the manifold of diffeomorphisms and is used to obtain an age-dependent atlas. Ericsson et al. (2008) propose a method for the construction of a patient-specific atlas where different average brain atlases are built in a small deformation setting according to meta-information such as sex, age, or clinical factors.

Methods for extracting features or biomarkers from magnetic resonance (MR) brain image data often begin by automatically segmenting regions of interest. A very popular segmentation method is to use label propagation which transforms labels from an atlas image to an unseen target image by bringing both images into alignment. Atlases are typically, but not necessarily, manually labelled. Early work using this approach was proposed by Bajcsy et al. (1983) as well as more recently Gee et al. (1993) and Collins et al. (1995). The accuracy of label propagation strongly depends on the accuracy of the underlying image alignment. To overcome the reliance on a single segmentation, Warfield et al. (2004) proposed STAPLE, a method that computes for a collection of segmentations a probabilistic estimate of the true segmentation. Rohlfing et al. (2004) demonstrated the improved robustness and accuracy of a multi-classifier framework where the labels propagated from multiple atlases are combined in a classifier fusion step to obtain a final segmentation of the target image. Label propagation in combination with classifier fusion was successfully used to segment a large number of structures in brain MR images by Heckemann et al. (2006).

Due to the wide range of anatomical variation, the selection of atlases becomes an important issue in multi-atlas segmentation. The selection of suitable atlases for a given target helps to ensure that the atlas-target registrations and the subsequent segmentation are as accurate as possible. Wu et al. (2007) describe different methods for improving segmentation results in the single atlas case by incorporating atlas selection. Aljabar et al. (2009) investigate different similarity measures for optimal atlas selection during multi-atlas segmentation. Van Rikxoort et al. (2008) propose a method where atlas combination is carried out separately in different sub-windows of an image until a convergence criterion is met. These approaches show that it is meaningful to select suitable atlases for each target image individually. Although an increasing number of MR brain images are available, the generation of high-quality manual atlases is a labour-intensive and expensive task (see e.g. Hammers et al. (2003)). This means that atlases are often relatively limited in number and, in most cases, restricted to a particular population (e.g. young, healthy subjects). This can limit the applicability of the atlas database even if a selection approach is used. To overcome this, Tang et al. (2009) seek to produce a variety of atlas images by utilizing a PCA model of deformations learned from transformations between a single template image and training images. Potential atlases are generated by transforming the initial template with a number of transformations sampled from the model. The assumption is that, by finding a suitable atlas for an unseen image, a fast and accurate registration to this template may be readily obtained. Test data with a greater level of variation than the training data would, however, represent a significant challenge to this approach. Additionally, the use of a highly variable training dataset may lead to an unrepresentative PCA model as the likelihood of registration errors between the diverse images and the single template is increased. This restriction makes this approach only applicable in cases where a good registration from all training images to the single initial template can be easily obtained.

Atlas-based segmentation benefits from the selection of atlases similar to the target image (Wu et al., 2007; Aljabar et al., 2009). However, in practice, the initial atlases may only represent a specific subgroup of the target image population.

There is therefore a desire to be able to propagate a relatively small number of atlases through to a large and diverse set of MR brain images exhibiting a significant amount of anatomical variability.

Prior work where automatically labelled brain images were used to label unseen images did not result in an improvement of segmentation accuracy over direct multi-atlas propagation. In (Heckemann et al., 2006), when multiple relatively homogenous atlases were propagated to randomly selected intermediate images that were used as single atlases for the segmentation of unseen images, the resulting average Dice overlaps with manual delineations were 0:80, compared with 0:84 for direct multi-atlas propagation and fusion. In a second experiment, single atlases were propagated to randomly selected intermediate subjects that were then further used for multi-atlas segmentation, resulting in Dice overlaps with manual delineations of 0:78 at best.

Further background art is provided by US 2007/0053589 A1, US 2008/0154118 A1 and WO 2009/093146 A1, all of which disclose methods for segmenting image data.

SUMMARY OF THE INVENTION

According to a first aspect of the present invention there is provided a method as defined in Claim 1 of the appended claims. Thus there is provided a method of processing medical images, performed by a computer processor and comprising the steps of: (a) obtaining one or more atlases containing one or more images in which one or more anatomical features have been labelled with label data; (b) obtaining a plurality of unlabelled images; (c) comparing the labelled and unlabelled images and selecting one or more unlabelled images that most closely resemble(s) one or more of the labelled images; (d) to each of those selected image(s), propagating label data from one or more of the closest of the labelled images, thereby labelling the corresponding anatomical feature(s) of each of the selected image(s) and causing the selected image(s) to become labelled image(s); and (e) iteratively repeating from step (c), thereby labelling others of the unlabelled images.

The term "labelled" should be interpreted broadly, to encompass any kind of delineation, segmentation or annotation of an anatomical feature. Similarly, the term "label data" should be interpreted broadly, to encompass any kind of coding that enables an anatomical feature to be delineated, segmented or annotated on a medical image.

By virtue of the iterative propagation of label data from the closest labelled images to the unlabelled images, each unlabelled image can be segmented using structurally-similar atlases. As a consequence, relatively large differences between a labelled image and an unlabelled image may be broken down into a number of small differences between comparatively similar initially-unlabelled images through which the label data is propagated, enabling registration errors to be reduced.

Preferable, optional, features are defined in the dependent claims.

Thus, preferably the step of comparing the labelled and unlabelled images comprises embedding the images into a low-dimensional coordinate system. This enables the labelled and unlabelled images to be compared and the differences to be quantitatively evaluated in a computationally-efficient manner. In certain embodiments the low-dimensional coordinate system may be a two-dimensional coordinate space, thus further simplifying the analysis and processing of the differences between the images.

Preferably the step of comparing the labelled and unlabelled images comprises defining a set of pairwise measures of similarity by comparing one or more respective anatomical features for each pair of images in the set of images. Particularly preferably this step further comprises performing a spectral analysis operation on the pairwise measures of similarity, although those skilled in the art will appreciate that there are other ways in which this may be accomplished.

The pairwise measures of similarity may represent the intensity similarity between a pair of images, and/or the amount of deformation between a pair of images.

Preferably the step of propagating label data comprises propagating label data from a plurality of the closest of the labelled images, based on a classifier fusion technique. This enables the selected image(s) to be labelled with greater accuracy.

Preferably the method further comprises, after step (d) and before step (e), a step of performing an intensity-based refinement operation on the newly-propagated label data, in order to further minimize the accumulation of registration errors during the labelling process.

The images may be of different subjects. Alternatively, at least some of the images may be of the same subject but taken at different points in time, thereby enabling intra-subject variance to be identified and studied.

The images may be magnetic resonance images, or other medical images familiar to those skilled in the art.

The method may further comprise labelling an anatomical feature representative of the presence or absence of a condition and using that feature to derive a biomarker for that condition. On the basis of the biomarker, the method may further comprise allocating a subject to a diagnostic category, and/or quantifying a subject's response to treatment, and/or selecting a subject's treatment.

According to a second aspect of the present invention there is provided imaging apparatus arranged to implement a method in accordance with the first embodiment of the invention. The imaging apparatus may be a medical scanner, such as an MRI scanner, or some other type.

According to a third aspect of the present invention there is provided image processing apparatus arranged to implement a method in accordance with the first embodiment of the invention.

According to a fourth aspect of the present invention there is provided a computer system arranged to implement a method in accordance with the first embodiment of the invention.

According to a fifth aspect of the present invention there is provided a computer program comprising coded instructions for implementing a method in accordance with the first embodiment of the invention.

According to a sixth aspect of the present invention there is provided computer-readable medium or physical carrier signal encoding a computer program in accordance with the fifth embodiment of the invention.

BRIEF DESCRIPTION OF THE DRAWINGS

Embodiments of the invention will now be described, by way of example only, and with reference to the drawings in which.

DETAILED DESCRIPTION OF PREFERRED EMBODIMENTS

The present embodiments represent the best ways known to the applicants of putting the invention into practice. However, they are not the only ways in which this can be achieved.

Primarily, the present embodiments take the form of a method or algorithm for processing medical (or other) images. The method or algorithm may be incorporated in a computer program or a set of instruction code capable of being executed by a computer processor. The computer processor may be that of a conventional (sufficiently high performance) computer, or some other image processing apparatus or computer system. Alternatively, the computer processor may be incorporated in, or in communication with, a piece of medical imaging equipment such as an MRI scanner.

The computer program or set of instruction code may be supplied on a computer-readable medium or data carrier such as a CD-ROM, DVD or solid state memory device. Alternatively, it may be downloadable as a digital signal from a connected computer, or over a local area network or a wide area network such as the Internet. As a further alternative, the computer program or set of instruction code may be hard-coded in the computer processor (or memory associated therewith) arranged to execute it.

Initial Overview

Our method begins with obtaining one or more pre-existing atlases, in which a set of digital images have already been labelled or annotated. A set of images onto which the labels or annotations are to be propagated are also obtained, for example from an MRI scanner or another piece of medical imaging equipment. The images in question may be of the brain. Alternatively they may be of other parts of the human (or animal) body, such as the knee—for example in order to diagnose osteoarthritis.

Figure 1:
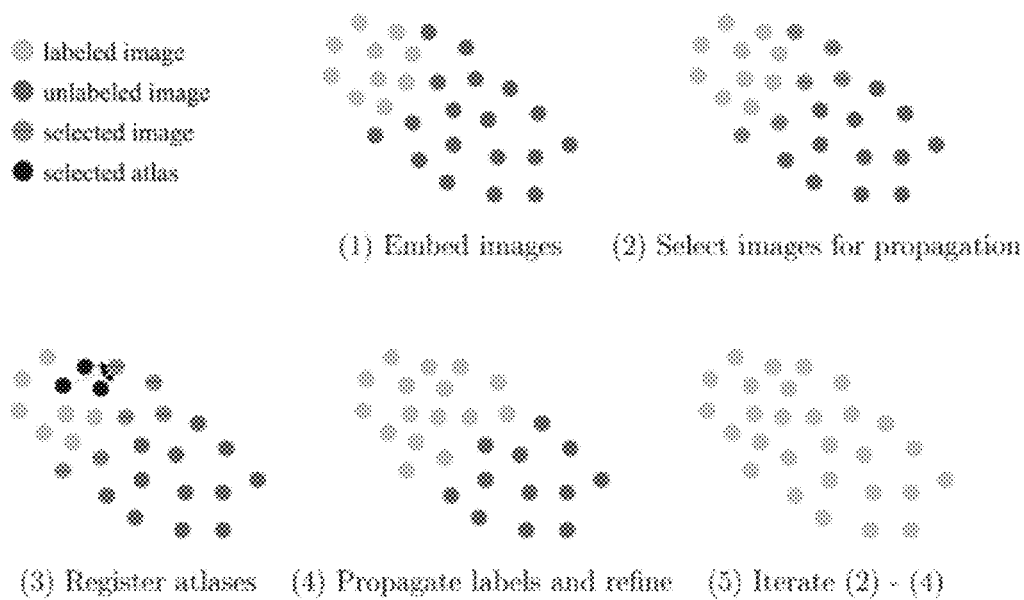
FIG. 1 illustrates the process of atlas propagation using our new method.

The atlas propagation and segmentation process using our new method is depicted in FIG. 1, which shows five steps. Firstly, in step (1), all the labelled images (i.e. atlases) and unlabelled images are embedded into a low-dimensional manifold. In step (2), the N closest unlabelled images to the labelled images are selected for segmentation. Then, in step (3), the M closest labelled images are registered to each of the selected images (an example for one selected image is illustrated). In step (4), intensity refinement is used to obtain label maps for each of the selected images. Then, in step (5), steps (2)-(4) are iterated until further images (and preferably all of them) are labelled.

As mentioned earlier, atlas-based segmentation benefits from the selection of atlases similar to the target image. Our method provides a framework where this is ensured by first embedding all images in a low dimensional coordinate system that provides a distance metric between images and allows neighbourhoods of images to be identified. In the manifold learned from coordinate system embedding, a propagation framework can be identified and labelled atlases can be propagated in a step-wise fashion, starting with the initial atlases, until the whole population is segmented. Each image is segmented using atlases that are within its neighbourhood, meaning that deformations between dissimilar images are broken down to several small deformations between comparatively similar images and registration errors are reduced. To further minimize an accumulation of registration errors, an intensity-based refinement of the segmentation is done after each label propagation step. Once segmented, an image can in turn be used as an atlas in subsequent segmentation steps. After all images in the population are segmented, they represent a large atlas database from which suitable subsets can be selected for the segmentation of unseen images. The coordinate system into which the images are embedded is obtained by applying a spectral analysis step to their pairwise similarities. As labelled atlases are propagated and fused for a particular target image, the information they provide is combined with a model based on the target image intensities to generate the final segmentation.

Thus, to propagate an initial set of atlases through a dataset of images with a high level of inter-subject variance, a manifold representation of the dataset is learned where images within a local neighbourhood are similar to each other. The manifold is represented by a coordinate embedding of all images. This embedding is obtained by applying a spectral analysis step to the complete graph in which each vertex represents an image and all pairwise similarities between images are used to define the edge weights in the graph. Pairwise similarities can be measured as the intensity similarity between the images or the amount of deformation between the images or as a combination of the two.

In successive steps, atlases are propagated within the newly defined coordinate system. In the first step, the initial set of atlases are propagated to a number of images in their local neighbourhood and used to label them. Images labelled in this way become atlases themselves and are, in subsequent steps, further propagated throughout the whole dataset. In this way, each image is labelled using a number of atlases in its close vicinity which has the benefit of decreasing registration error.

In an extension of this technique, one or more scans obtained from the same subject but at different times (so-called "longitudinal" scans) may be labelled.

After propagating multiple atlases to each baseline scan, spatial priors obtained from the multiple atlases may be used to segment not only the baseline scans (as done initially) but also the longitudinal scans. Hence, this extended technique enables the simultaneous segmentation of different time points (e.g. day 0, day 3, day 15, etc.), which in turn allows a measurement of the differences between time points.

Thus, images of a subject taken at subsequent time points from the baseline images can be segmented simultaneously and used to identify intra-subject variance (i.e. differences in anatomical structure within a single subject but at different time points).

Graph Construction and Manifold Embedding

In order to determine the intermediate atlas propagation steps, all images are embedded in a manifold represented by a coordinate system which is obtained by applying a spectral analysis step. Spectral analytic techniques have the advantage of generating feature coordinates based on measures of pairwise similarity between data items such as images. This is in contrast to methods that require distance metrics between data items such as multidimensional scaling (MDS). After a spectral analysis step, the distance between two images in the learned coordinate system is dependent not only upon the original pairwise similarity between them but also upon all the pairwise similarities each image has with the remainder of the population. This makes the distances in the coordinate system embedding a more robust measure of proximity than individual pairwise measures of similarity which can be susceptible to noise. A good introduction to spectral analytic methods can be found in von Luxburg (2007) and further details are available in Chung (1997).

The spectral analysis step is applied to the complete, weighted and undirected graph $G=(V, E)$ with each image in the dataset being represented by one vertex $v_i$. The non-negative weights $w_{ij}$ two vertices $v_i$ and $v_j$ are defined by the similarity $s_{ij}$ the respective images. In the present work intensity based similarities are used. A weights matrix W for G is obtained by collecting the edge weights $w_{ij}=s_{ij}$ every image pair and a diagonal matrix T contains the degree sums for each vertex $$d_{ii} = \sum_j w_{ij}.$$

Figure 2:
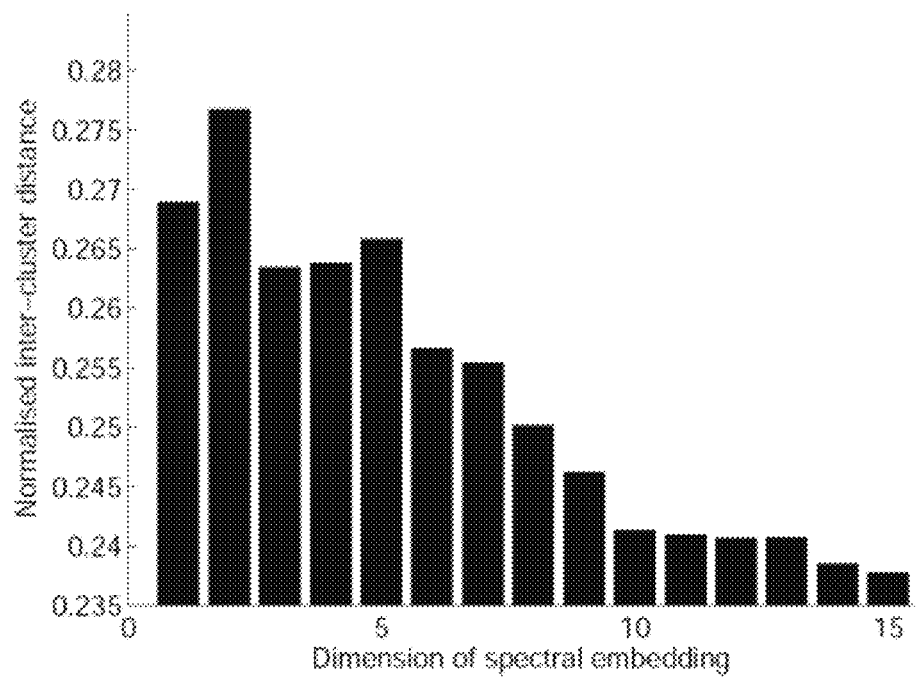
FIG. 2 illustrates results showing the discrimination ability for different chosen feature dimensions among four subject groups (healthy young, elderly controls, MCI, AD)

The dimension of the feature data derived from a spectral analysis step can be chosen by the user. In our work, we tested each dimension for the feature data in turn and assessed the ability to discriminate between the four subject groups (young, AD, MCI and older control subjects). The discrimination ability was measured using the average inter-cluster distance based on the centroids of each cluster for each feature dimension. For the groups studied, it was maximal when using two-dimensional features and reduced thereafter (see FIG. 2). We therefore chose to use the 2D spectral features as a coordinate space in which to embed the data.

Image Similarities

In the preferred embodiment of our method, we use an intensity-based similarity between a pair of images $I_i$ and $I_j$. This similarity is based on normalized mutual information (NMI) (Studholme et al., 1999) which is with the entropy H(I) of an image I and the joint entropy $H(I_i; I_j)$ of two images defined as $$NMI_{ij} = \frac{H(I_i) + H(I_j)}{H(I_i, I_j)}.$$

Figure 3:
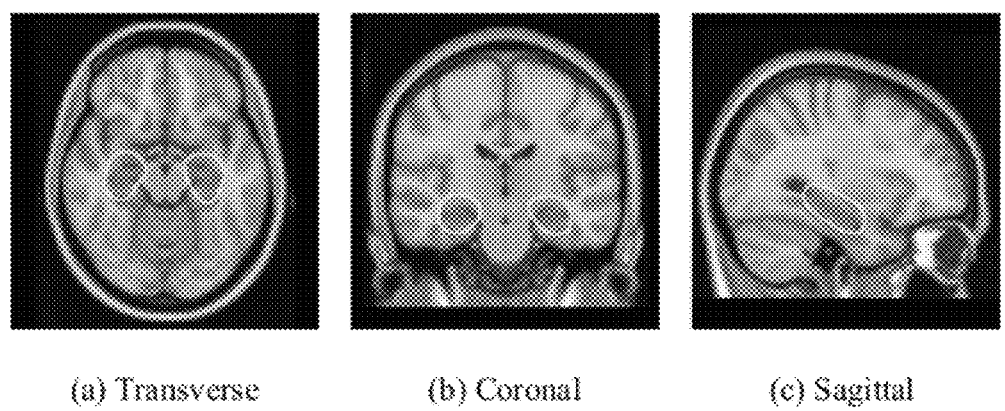
FIG. 3 illustrates the MNI152 brain atlas showing the region of interest around the hippocampus that was used for the evaluation of pairwise image similarities.

For example, when segmenting the hippocampus, we compute the similarity measure between a pair of images as the NMI over a region of interest (ROI) around the hippocampus. The framework is, however, general and a user can choose the similarity measure and region of interest appropriate to the region or structure being segmented. To define the ROI, all training images are automatically segmented using standard multi-atlas segmentation (Heckemann et al., 2006). The resulting hippocampal labels are then aligned to a known brain atlas (e.g. the MNI152-brain T1 atlas (Mazziotta et al., 1995)) using a coarse non-rigid registration modelled by free-form deformations (FFDs) with a 10 mm B-spline control point spacing (Rueckert et al., 1999) between the corresponding image and the atlas. The hippocampal ROI are then defined through the dilation of the region defined by all voxels which are labelled as hippocampus by at least 2% of the segmentations. To evaluate the pairwise similarities, all images are aligned to the known atlas using the same registrations used for the mask building. FIG. 3 shows the ROI around the hippocampus superimposed on the brain atlas used for image normalization.

Segmentation Propagation in the Learned Manifold

In order to propagate the atlas segmentations through the dataset using the learned manifold, all images I ∈ I are separated into two groups, containing the labelled and unlabeled images. These groups are indexed by the sets L and U respectively. Initially, L represents the initial atlas images and U represents all other images. Let $d(I_i; I_j)$ represent the Euclidean distance between images $I_i$ and $I_j$ in the manifold. The average distance from an unlabeled image $I_u$ to all labelled images is:

$$\bar{d}(I_u, L) = \frac{1}{|L|} \sum_{l \in L} d(I_u, I_l).$$

At each iteration, the images $I_u$, u ∈ U with the N smallest average distances $\bar{d}(I_u)$ are chosen as targets for propagation. For each of these images, the M closest images drawn from $I_l$, l ∈ L are selected as atlases to be propagated. Subsequently, the index sets U and L are updated to indicate that the target images in the current iteration have been labelled. Stepwise propagation is performed in this way until all images in the dataset are labelled.

N is an important parameter as it determines the number of images labelled during each iteration and therefore it strongly affects the expected number of intermediate steps that are taken before a target image is segmented. M defines the number of atlas images used for each application of multiatlas segmentation. A natural choice is to set M to the number of initial atlases. Independent of the choice of N, the number of registrations needed to segment K images is M×K. The process of segmentation propagation in the learned manifold is summarized in Algorithm 1:

---

Algorithm 1: Segmentation propagation in the learned manifold

Set L to represent the initial set of atlases
Set U to represent all remaining images
while |U| > 0 do
    for all $I_u$ ∈ U do
        calculate $\bar{d}(I_u,L)$
    end for
    Reorder index set U to match the order of $\bar{d}(I_u,L)$
    for i = 1 to N do
        Select M images from $I_l$,l ∈ L that are closest to $I_{u_i}$
        Register the selected atlases to $I_{u_i}$
        Generate a multi-atlas segmentation estimate of $I_{u_i}$
    end for
    Transfer the indices $\{u_1,...,u_N\}$ from U to L
end while

---

Multi-atlas Propagation and Segmentation Refinement

Each label propagation is carried out by applying a modified version of the method for hippocampus segmentation described in van der Lijn et al. (2008). In this method the segmentations $f^j$, j=1, . . . , M obtained from registering M atlases are not fused to hard segmentation as in Heckemann et al. (2006) but are instead used to form a probabilistic atlas in the coordinate system of the target image I. This is an example of a "classifier fusion" technique.

In the original work, this subject-specific atlas is combined with previously learned intensity models for foreground and background to give an energy function that is optimized by graph cuts. We previously extended this method in a way that directly estimates the intensity models from the unseen image and that generalizes the approach to more than one structure (Wolz et al., 2009). A Gaussian distribution for a particular structure is estimated from all voxels which at least 95% of the atlases assign to this particular structure. The background distribution for a particular structure i with label $f_i$ is estimated from the Gaussian intensity distributions of all other structures with label $f_j$, j≠i and of Gaussian distributions for the tissue classes $T_k$, k=1, . . . , 3 in areas where no particular structure is defined.

By incorporating intensity information from the unseen image into the segmentation process, errors obtained with conventional multi-atlas segmentation can be overcome.

Each registration used to build the subject-specific probabilistic atlas may be carried out in three steps: rigid, affine and non-rigid. Rigid and affine registrations are carried out to correct for global differences between the images. In the third step, two images are non-rigidly aligned using a freeform deformation model in which a regular lattice of control point vectors are weighted using B-spline basis functions to provide displacements at each location in the image (Rueckert et al., 1999). The deformation is driven by the normalized mutual information (Studholme et al., 1999) of the pair of images. The spacing of B-spline control points defines the local exibility of the non-rigid registration. A sequence of control point spacings may be used in a multi-resolution fashion (20 mm, 10 mm, 5 mm and 2.5 mm).

It will be appreciated that, in our method, we use multi-atlas segmentation to systematically label intermediate atlases that are then used for multi-atlas segmentation of target images that are selected according to their similarity with the previously labelled atlas images. Compared to previous work, we are dealing with a very diverse set of images. In such a scenario the gain from only registering similar images is more likely to outweigh the accumulation of registration errors.

Experimental Validation

We validated our new method experimentally as follows: We began by taking an initial set of manually labelled atlases consisting of 30 MR images from young and healthy subjects (age range 20-54, median age 30.5 years) together with manual label maps defining 83 anatomical structures of interest. In this set, the T1-weighted MR images had been acquired with a GE MR-scanner using an inversion recovery prepared fast spoiled gradient recall sequence with the following parameters: TE/TR 4.2 ms (fat and water in phase)/15.5 ms, time of inversion (TI) 450 ms, flip angle 20°, to obtain 124 slices of 1.5-mm thickness with a field of view of 18×24 cm with a 192×256 image matrix.

We then used our method to propagate this initial set of atlases to a dataset of 796 MR images acquired from patients with Alzheimer's Disease (AD) and mild cognitive impairment (MCI) as well as age matched controls from the Alzheimer's Disease Neuroimaging Initiative (ADNI) database (www.loni.ucla.edu/ADNI). In the ADNI study, brain MR images had been acquired at baseline and regular intervals from approximately 200 cognitively normal older subjects, 400 subjects with MCI, and 200 subjects with early AD.

From the results discussed below, it will be seen that this approach provides more accurate segmentations due, at least in part, to the associated reductions in inter-subject registration error.

Coordinate System Embedding

Figure 4:
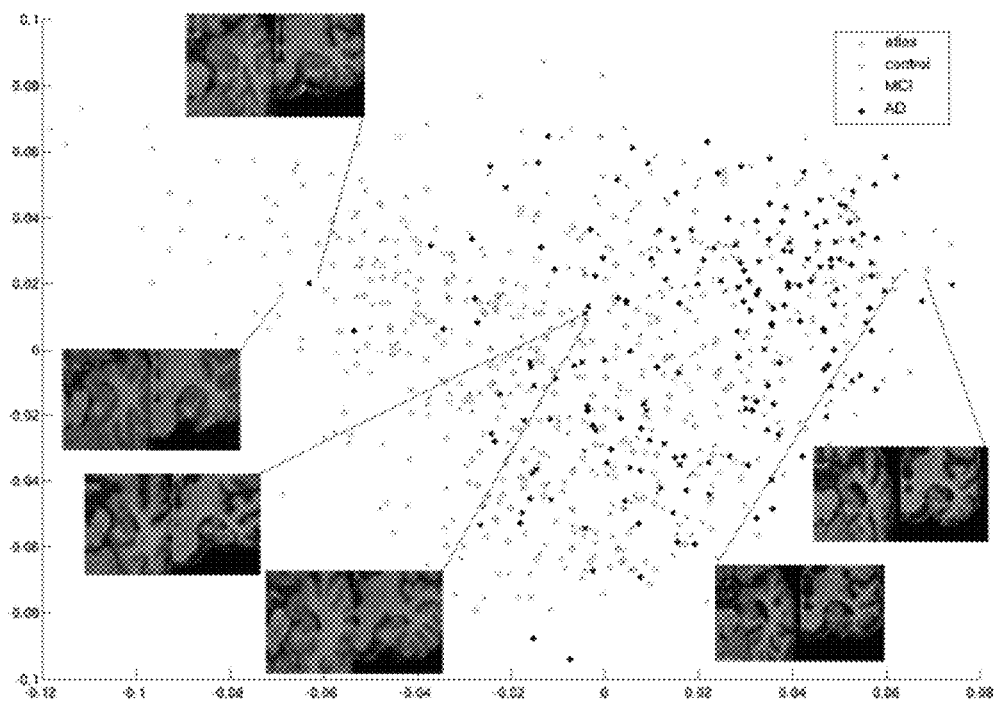
FIG. 4 illustrates coordinate embedding of 30 atlases based on healthy subjects and 796 images from elderly dementia patients and age-matched control subjects.

We applied the method for coordinate system embedding described above to a set of images containing the 30 initial atlases and the 796 ADNI images. We used the first two features from spectral graph analysis to embed all images into a 2D coordinate system. The results of coordinate system embedding are displayed in FIG. 4. The original atlases form a distinct cluster on the left hand side of the graph at low values for the first feature. Furthermore it can be seen that control subjects are mainly positioned at lower values, whereas the majority of AD subjects is positioned at higher values. The hippocampal area for chosen example subjects is displayed in FIG. 4. These types of observations support the impression that neighbourhoods in the coordinate system embedding represent images that are similar in terms of hippocampal appearance.

All 796 images were segmented using five different approaches:
  I. Direct segmentation using standard multi-atlas segmentation.
  II. Direct segmentation using multi-atlas segmentation in combination with an intensity refinement based on graph cuts.
  III. Our new method, with M=30 and N=300 and no intensity refinement after multiatlas segmentation.
  IV. Our new method, with M=30 and N=1.
  V. Our new method, with M=30 and N=300.

Evaluation of Segmentations

For evaluation we compared the automatic segmentation of the ADNI images with a manual hippocampus segmentation. This comparison was carried out for all of the images for which ADNI provides a manual segmentation (182 out of 796). Comparing these 182 subjects (Table 1) with the entire population of 796 subjects (Table 2) shows that the subgroup is characteristic of the entire population in terms of age, sex, MMSE and pathology.

TABLE 1

Characteristics of the subjects used for comparison between manual and automatic segmentation

|  | N | M/F | Age | MMSE |
|---|---|---|---|---|
| Normal | 57 | 27/30 | 77.10 ± 4.60 [70-89] | 29.29 ± 0.76 [26-30] |
| MCI | 84 | 66/18 | 76.05 ± 6.77 [60-89] | 27.29 ± 3.22 [24-30] |
| AD | 41 | 21/20 | 76.08 ± 12.80 [57-88] | 23.12 ± 1.79 [20-26] |

TABLE 2

Information relating to the subjects whose images were used in this work

|  | N | M/F | Age | MMSE |
|---|---|---|---|---|
| Normal | 222 | 106/216 | 76.00 ± 5.08 [60-90] | 29.11 ± 0.99 [25-30] |
| MCI | 392 | 138/254 | 74.68 ± 7.39 [55-90] | 27.02 ± 1.79 [23-30] |
| AD | 182 | 91/91 | 75.84 ± 7.63 [55-91] | 23.35 ± 2.00 [18-27] |

Figure 5:
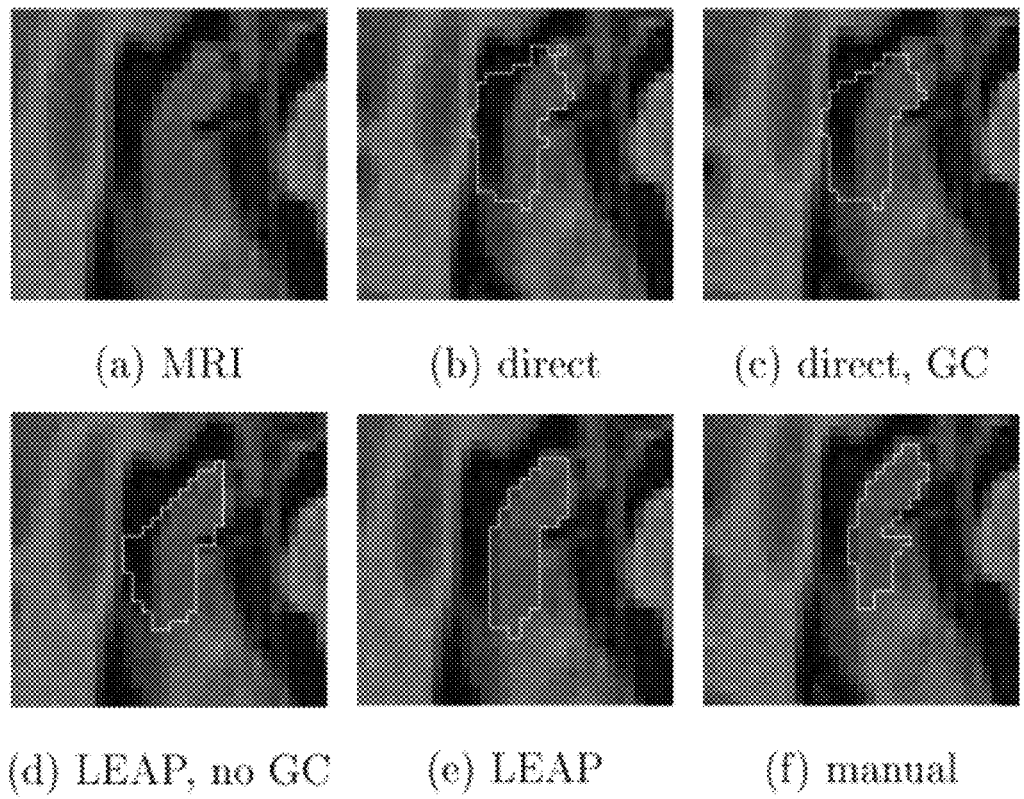
FIG. 5 illustrates a comparison of segmentation results for the right hippocampus on a transverse slice.

An example for the segmentation of the right hippocampus of an AD subject is shown in FIG. 5, with images (b), (c), (d), (e) corresponding to methods I, II, III and V respectively. A clear over-segmentation into CSF space and especially an under-segmentation in the anterior part of the hippocampus can be observed, both in the case of multi-atlas segmentation with and without intensity-based refinement (methods I and II). The fact that the intensity-based refinement cannot compensate for this error is due to the high spatial prior in this area that is caused by a significant misalignment of the majority of atlases in this area. The resulting high spatial prior cannot be overcome by the intensity-based correction scheme. When using the proposed framework without intensity-refinement (method III), the topological errors can be avoided, but the over-segmentation into CSF space is still present. The figure also shows that all observed problems can be avoided by using the proposed framework. In FIG. 5 (and also FIG. 6 and Table 3 below), the results obtained using our new method are identified by the term "LEAP" (short for "Learning Embeddings for Atlas Propagation").

The average overlaps as measured by the Dice coefficient or similarity index (SI) (Dice, 1945) for the segmentation of left and right hippocampus on the 182 images used for evaluation are shown in Table 3. The difference between all pairs of the five methods is statistically significant with $p<0.001$ on Student's two-tailed paired t-test.

TABLE 3

Dice overlaps for hippocampus segmentation

| | Left hippocampus | Right hippocampus |
|---|---|---|
| Direct | 0.775 ± 0.087 | 0.790 ± 0.080 |
| | [0.470-0.904] | [0.440-0.900] |
| Direct, GC | 0.820 ± 0.064 | 0.825 ± 0.065 |
| | [0.461-0.903] | [0.477-0.901] |
| LEAP, N = 300, no GC | 0.808 ± 0.054 | 0.814 ± 0.053 |
| | [0.626-0.904] | [0.626-0.900] |
| LEAP, N = 1 | 0.838 ± 0.023 | 0.830 ± 0.024 |
| | [0.774-0.888] | [0.753-0.882] |
| LEAP, N = 300 | 0.848 ± 0.033 | 0.848 ± 0.030 |
| | [0.676-0.903] | [0.729-0.905] |

Figure 6:
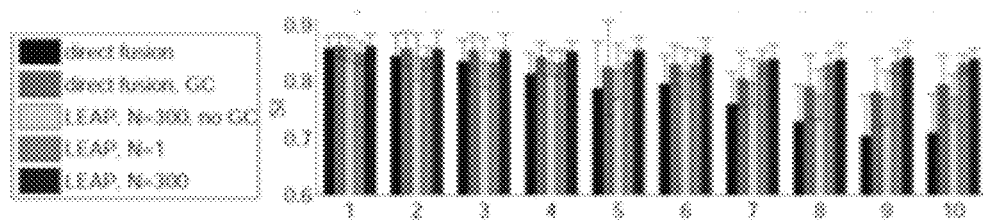
FIG. 6 illustrates the development of segmentation accuracy with increasing distance from the original set of atlases, with each subset of images used for evaluation being represented by one bar plot.

These results clearly show an improved segmentation accuracy and robustness for the proposed method. Our hypothesis is that by avoiding the direct registration of images whose distance in the embedded space is too large but instead registering the images via multiple intermediate images improves significantly the segmentation accuracy and robustness of multi-atlas segmentation. To test this hypothesis we have investigated the development of the segmentation accuracy as a function of distances in the coordinate system embedding as well as the number of intermediate steps. FIG. 6 shows this for the five segmentation methods in the form of ten bar plots: Each bar plot corresponds to the average SI overlap of 18 images (20 in the last plot). The first plot represents the 18 images closest to the original atlases, the next plot represents images slightly further from the original atlases and so on. These results show the superiority of the proposed method over direct multi-atlas segmentation approaches in segmenting images that are different from the original atlas set.

With increasing distance from the original atlases in the learned manifold, the accuracy of direct multi-atlas segmentation (method I) as well as multiatlas segmentation with intensity-based refinement (method II) steadily decreases. By contrast, our new method with both parameter settings shows a steady level of segmentation accuracy. It is interesting to see that our method with a step width of N=1 (method IV) leads to worse results than the direct multiatlas methods up to a certain distance from the original atlases. This can be explained by registration errors accumulated through many registration steps. With increasing distance from the atlases, however, the gain from using intermediate templates, outweighs this registration error. Furthermore, the accumulated registration errors do not seem to increase dramatically after a certain number of registrations. This is partly due to the intensity-based correction in every multi-atlas segmentation step which corrects for small registration errors. Segmenting the 300 closest images with our new method before doing the next intermediate step (N=300, method V), leads to results at least as good as and often better than those given by the direct methods for images at all distances from the initial atlases. The importance of an intensity-based refinement step after multi-atlas segmentation is also underlined by the results of method III. When applying our new method without this step, the gain compared to method I gets more and more significant with more intermediate steps, but the accuracy still declines significantly which can be explained by a deterioration of the propagated atlases (note that for the first 300 images, method II and method V are identical, as are methods I and III). The influence of N on the segmentation accuracy is governed by the trade-off between using atlases that are as close as possible to the target image (small N) and using a design where a minimum number of intermediate steps are used to avoid the accumulation of registration errors (large N). Due to the computational complexity of evaluating the framework, we restricted the evaluation to two values.

Volume Measurements

Figure 7:
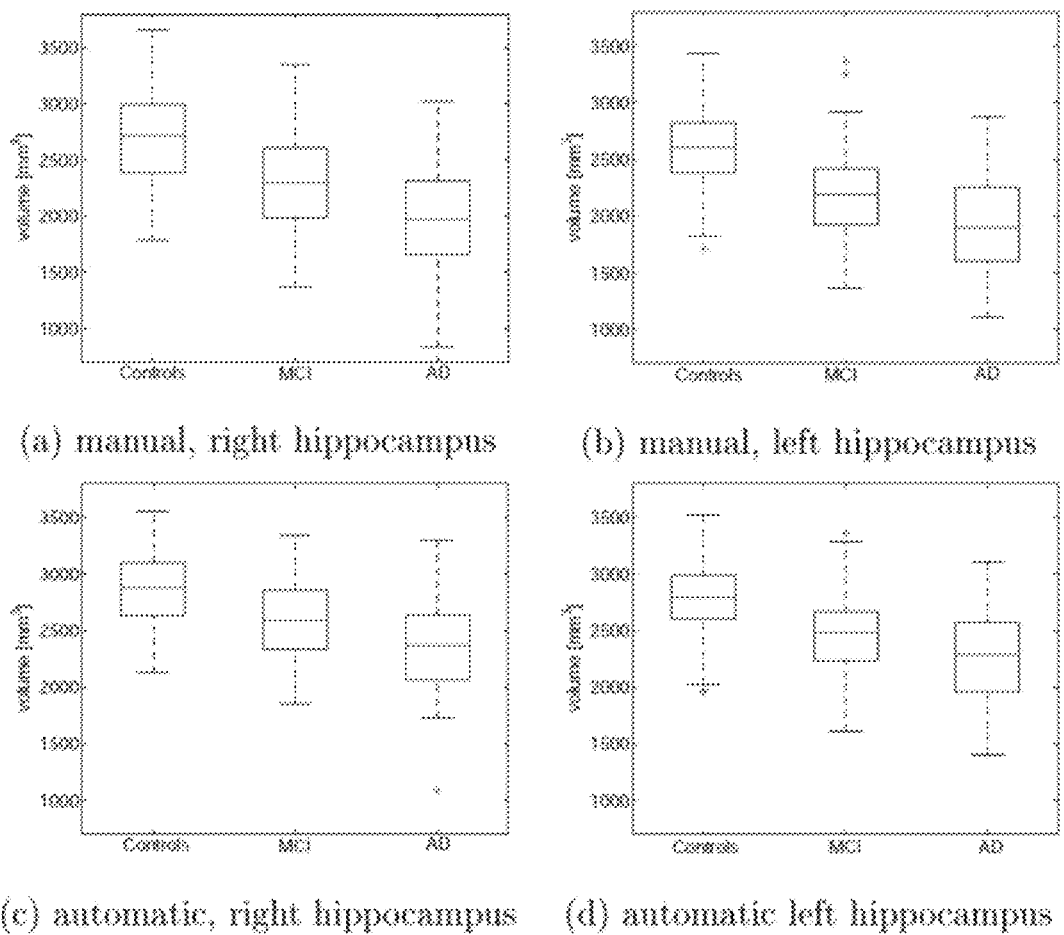
FIG. 7 illustrates average hippocampal volumes for manual and automatic segmentation.

A reduction in hippocampal volume is a well-known factor associated with cognitive impairment (e.g. Jack et al. (1999); Reiman et al. (1998)). To measure the ability of our method to discriminate clinical groups by hippocampal volume, we compared the volumes measured on the 182 manually labelled images to the ones obtained from our automatic method (method V, LEAP with M=30 and N=300). Boxplots showing these volumes for the left and right hippocampus are presented in FIG. 7, which shows average hippocampal volumes for manual and automatic segmentation using method IV. The discriminative power for the volume of left and right hippocampus between all pairs of clinical groups is statistically significant with $p<0.05$ on a Student's t-test but is slightly less significant than the manual discrimination.

Figure 8:
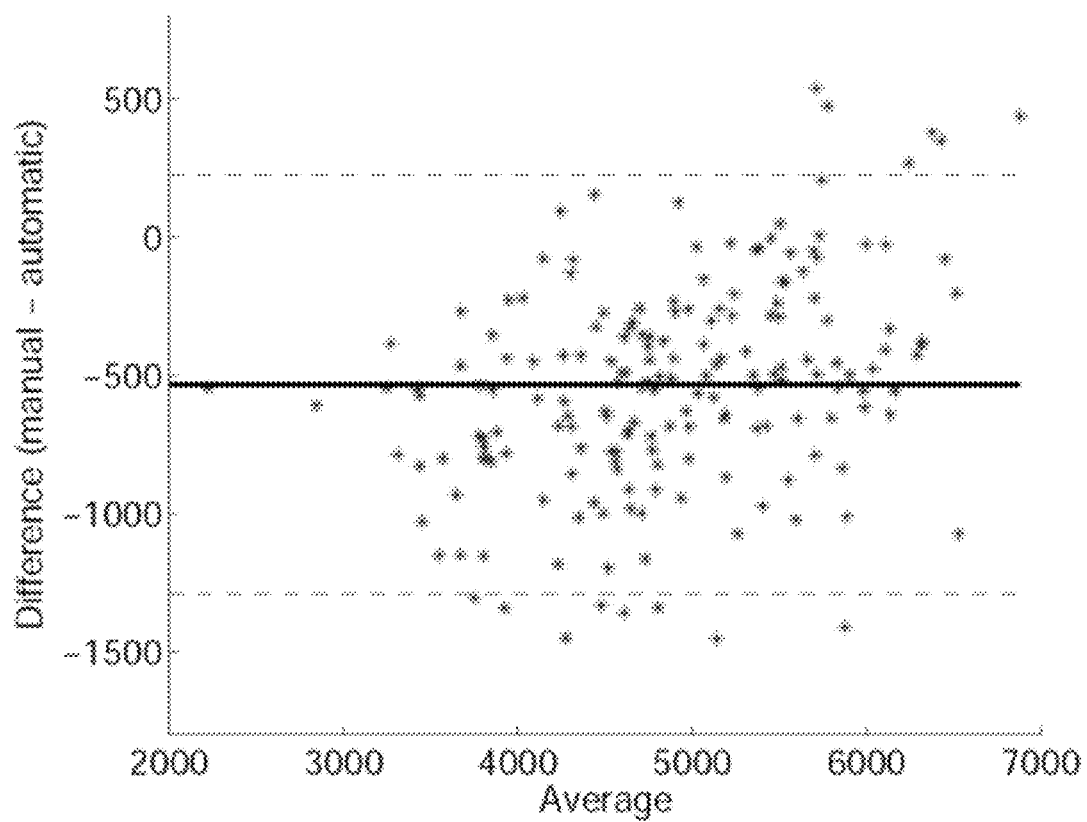
FIG. 8 is a Bland-Altman plot showing the agreement between volume measurement based on manual and automatic segmentation of the hippocampus.

FIG. 8 is a Bland-Altman plot showing the agreement between volume measurement based on manual and automatic segmentation of the hippocampus (method IV), with the solid line representing the mean and the dashed lines representing ±1.96 standard deviations. This plot supports the impression of the volume measures in FIG. 7 that the automated method tends to slightly overestimate the hippocampal volumes. This over-segmentation is more significant for small hippocampi. The same phenomenon has been described for an automatic segmentation method before by Hammers et al. (2007). The intraclass correlation coefficient (ICC) between the volume measurements based on the manual and automatic segmentation is 0:898 (ICC (3,1) Shrout-Fleiss reliability (Shrout and Fleiss, 1979)). This value is comparable to the value of 0:929 reported in Niemann et al. (2000) for inter-rater reliability.

Discussion and Conclusion

In this work we have described our new method for propagating an initial set of brain atlases to a diverse population of unseen images via multiatlas segmentation. We begin by embedding all atlas and target images in a coordinate system where similar images according to a chosen measure are close. The initial set of atlases is then propagated in several steps through the manifold represented by this coordinate system. This avoids the need to estimate large deformations between images with significantly different anatomy and the correspondence between them is broken down into a sequence of comparatively small deformations. The formulation of the framework is general and is not tied to a particular similarity measure, coordinate embedding or registration algorithm.

We applied our new method to a target dataset of 796 images acquired from elderly dementia patients and age matched controls using a set of 30 atlases of healthy young subjects. In this first application of the method, we have applied it to the task of hippocampal segmentation even though the proposed framework can be applied to other anatomical structures as well. The proposed method shows consistently improved segmentation results compared to standard multi-atlas segmentation. We have also demonstrated a consistent level of accuracy for the proposed approach with increasing distance from the initial set of atlases and therefore with more intermediate registration steps. The accuracy of standard multi-atlas segmentation, on the other hand, steadily decreases. This observation suggests three main conclusions:

(1) The decreasing accuracy of the standard multi-atlas segmentation suggests that the coordinate system embedding used is meaningful. The initial atlases get less and less suitable for segmentation with increasing distance.

(2) The almost constant accuracy of the proposed method suggests that, by using several small deformations, it is possible to indirectly deform an atlas appropriately to a target in a way that is not matched by a direct deformation within the multi-atlas segmentation framework used.

(3) The gain from restricting registrations to similar images counters the accumulation of errors when using successive small deformations.

Our results indicate that, if many intermediate registrations are used, the segmentation accuracy initially declines quickly but then remains relatively constant with increasing distance from the initial atlases. The initial decline can be explained by an accumulation of registration errors which results from many intermediate registration steps. The reason why the accuracy does not monotonically decline is likely to be due to the incorporation of the intensity model during each multi-atlas segmentation step. By automatically correcting the propagated segmentation based on the image intensities, the quality of the atlas can be preserved to a certain level.

Apart from the obvious application of segmenting a dataset of diverse images with a set of atlases based on a sub-population, the proposed method can be seen as an automatic method for generating a large repository of atlases for subsequent multi-atlas segmentation with atlas selection (Aljabar et al., 2009). Since the manual generation of large atlas databases is expensive, time-consuming and in many cases unfeasible, the proposed method could potentially be used to automatically generate such a database.

Notwithstanding the challenge represented by variability due to image acquisition protocols and inter-subject variability in a dataset as large and as diverse as the one in the ADNI-study, the results achieved with our method compare well to state of the art methods applied to more restricted datasets (van der Lijn et al., 2008; Morra et al., 2008; Chupin et al., 2009; Hammers et al., 2007) in terms of accuracy and robustness.

Summary

We have presented a new framework for the automatic propagation of a set of manually labelled brain atlases to a diverse set of images of a population of subjects. A manifold is learned from a coordinate system embedding that allows the identification of neighbourhoods which contain images that are similar based on a chosen criterion. Within the new coordinate system, the initial set of atlases is propagated to all images through a succession of multi-atlas segmentation steps. This breaks the problem of registering images which are very "dissimilar" down into a problem of registering a series of images which are "similar". At the same time it allows the potentially large deformation between the images to be modelled as a sequence of several smaller deformations.

Acknowledgement

The work leading to this invention has received funding from the European Community's Seventh Framework Programme (FP7/2007-2011) under grant agreement no. 224328.

REFERENCES

Aljabar, P., Heckemann, R., Hammers, A., Hajnal, J., Rueckert, D., 2009. Multi-atlas based segmentation of brain images: Atlas selection and its effect on accuracy. NeuroImage 46 (3), 726-738.

Avants, B., Gee, J. C., 2004. Geodesic estimation for large deformation anatomical shape averaging and interpolation. NeuroImage 23 (Supplement 1), S139-S150, Mathematics in Brain Imaging.

Bajcsy, R., Lieberson, R., Reivich, M., August 1983. A computerized system for the elastic matching of deformed radiographic images to idealized atlas images. J. Comput. Assisted Tomogr. 7, 618-625.

Blezek, D. J., Miller, J. V., 2007. Atlas stratification. Medical Image Analysis 11 (5), 443-457.

Chung, F. R. K., 1997. Spectral graph theory. Regional Conference Series in Mathematics, American Mathematical Society 92, 1-212.

Chupin, M., Hammers, A., Liu, R., Colliot, O., Burdett, J., Bardinet, E., Duncan, J., Garnero, L., Lemieux, L., 2009. Automatic segmentation of the hippocampus and the amygdala driven by hybrid constraints: Method and validation. NeuroImage 46 (3), 749-761.

Collins, D. L., Holmes, C. J., Peters, T. M., Evans, A. C., 1995. Automatic 3-D model-based neuroanatomical segmentation. Human Brain Mapping 3 (3), 190-208.

Davis, B. C., Fletcher, P. T., Bullitt, E., Joshi, S., 2007. Population shape regression from random design data. In: ICCV. pp. 1-7.

Dice, L. R., 1945. Measures of the amount of ecologic association between species. Ecology 26 (3), 297-302.

Ericsson, A., Aljabar, P., Rueckert, D., 2008. Construction of a patient-specific atlas of the brain: Application to normal aging. In: ISBI. IEEE, pp. 480-483.

Gee, J. C., Reivich, M., Bajcsy, R., March-April 1993. Elastically deforming 3D atlas to match anatomical brain images. Journal of Computer Assisted Tomography 17 (2), 225-236.

Hammers, A., Allom, R., Koepp et al., M. J., August 2003. Three-dimensional maximum probability atlas of the human brain, with particular reference to the temporal lobe. Human Brain Mapping 19 (4), 224-247.

Hammers, A., Heckemann, R., Koepp, M. J., Duncan, J. S., Hajnal, J. V., Rueckert, D., Aljabar, P., 2007. Automatic detection and quantification of hippocampal atrophy on MRI in temporal lobe epilepsy: A proof-of-principle study. NeuroImage 36 (1), 38-47.

Heckemann, R. A., Hajnal, J. V., Aljabar, P., Rueckert, D., Hammers, A., 2006. Automatic anatomical brain MRI segmentation combining label propagation and decision fusion. NeuroImage 33 (1), 115-126.

Jack, C. R., J., Petersen, R. C., Xu, Y. C., O'Brien, P. C., Smith, G. E., Ivnik, R. J., Boeve, B. F., Waring, S. C., Tangalos, E. G., Kokmen, E., 1999. Prediction of AD with MRI-based hippocampal volume in mild cognitive impairment. Neurology 52 (7), 1397-1407.

Joshi, S., Davis, B., Jomier, M., Gerig, G., 2004. Unbiased diffeomorphic atlas construction for computational anatomy. NeuroImage 23 (Supplement 1), 151-160, mathematics in Brain Imaging.

Mazziotta, J. C., Toga, A. W., Evans, A. C., Fox, P. T., Lancaster, J. L., June 1995. A probabilistic atlas of the human brain: Theory and rationale for its development. the international consortium for brain mapping (ICBM). NeuroImage 2 (2a), 89-101.

Morra, J. H., Tu, Z., Apostolova, L. G., Green, A. E., Avedissian, C., Madsen, S. K., Parikshak, N., Hua, X., Toga, A. W., Jr., C. R. J., Weiner, M. W., Thompson, P. M., 2008. Validation of a fully automated 3D hippocampal segmentation method using subjects with Alzheimer's disease mild cognitive impairment, and elderly controls. NeuroImage 43 (1), 59-68.

Niemann, K., Hammers, A., Coenen, V. A., Thron, A., Klosterktter, J., 2000. Evidence of a smaller left hippocampus and left temporal horn in both patients with first episode schizophrenia and normal control subjects. Psychiatry Research: Neuroimaging 99 (2), 93-110.

Reiman, E. M., Uecker, A., Caselli, R. J., Lewis, S., Bandy, D., de Leon, M. J., Santi, S. D., Convit, A., Osborne, D., Weaver, A., Thibodeau, S. N., August 1998. Hippocampal volumes in cognitively normal persons at genetic risk for Alzheimer's disease. Annals of Neurology 44 (2), 288-291.

Rohlfing, T., Russakoff, D. B., Jr, C. R. M., 2004. Performance-based classifier combination in atlas-based image segmentation using expectation-maximization parameter estimation. IEEE Trans. Med. Imaging 23 (8), 983-994.

Rueckert, D., Sonoda, L. I., Hayes, C., Hill, D. L. G., Leach, M. O., Hawkes, D. J., August 1999. Nonrigid registration using free-form deformations: Application to breast MR images. IEEE Trans. Medical Imaging 18 (8), 712-721.

Sabuncu, M. R., Balci, S. K., Golland, P., 2008. Discovering modes of an image population through mixture modeling. In: MICCAI (2). Vol. 5242 of Lecture Notes in Computer Science. Springer, pp. 381-389.

Shrout, P., Fleiss, J., 1979. Intraclass correlation: uses in assessing rater reliability. Psychological Bulletin 86, 420-428.

Studholme, C., Hill, D. L. G., Hawkes, D. J., January 1999. An overlap invariant entropy measure of 3D medical image alignment. Pattern Recognition 32 (1), 71-86.

Tang, S., Fan, Y., Kim, M., Shen, D., February 2009. RABBIT: rapid alignment of brains by building intermediate templates. In: SPIE. Vol. 7259.

van der Lijn, F., den Heijer, T., Breteler, M. M., Niessen, W. J., 2008. Hippocampus segmentation in MR images using atlas registration, voxel classification, and graph cuts. NeuroImage 43 (4), 708-720.

van Rikxoort, E. M., Isgum, I., Staring, M., Klein, S., van Ginneken, B., 2008. Adaptive local multi-atlas segmentation: application to heart segmentation in chest CT scans. Vol. 6914. SPIE, p. 691407.

von Luxburg, U., 2007. A tutorial on spectral clustering. Statistics and Computing 17 (4), 395-416.

Warfield, S. K., Zou, K. H., Wells III, W. M., 2004. Simultaneous truth and performance level estimation (STAPLE): an algorithm for the validation of image segmentation. IEEE Trans. Med. Imaging 23 (7), 903-921.

Wolz, R., Aljabar, P., Heckemann, R. A., Hammers, A., Rueckert, D., 2009. Segmentation of subcortical structures and the hippocampus in brain MRI using graph-cuts and subject-specific a-priori information. IEEE International Symposium on Biomedical Imaging—ISBI 2009.

Wu, M., Rosano, C., Lopez-Garcia, P., Carter, C. S., Aizenstein, H. J., 2007. Optimum template selection for atlas-based segmentation. NeuroImage 34 (4), 1612-1618.

The invention claimed is:

1. A method of processing medical images, the method being performed by a computer processor and comprising steps of:
   (a) obtaining one or more atlases containing one or more images, the one or more images are characterized in that they are composed of a plurality of voxels wherein at least some of the voxels correspond to one or more anatomical features that have been labelled with label data;
   (b) obtaining a plurality of unlabelled images each composed of a respective plurality of voxels;
   (c) comparing the one or more labelled images and each unlabelled image of the plurality of unlabeled images, resulting in a comparison;
   (d) based on the comparison, selecting one or more unlabelled images that most closely resemble(s) one or more of the labelled images;
   (e) propagating label data of the one or more labelled anatomical features from the one or more closest of the labelled images to each of the selected one or more unlabelled images, so that when the corresponding anatomical feature(s) of each of the selected images(s) become labelled, the selected image(s) become labelled image(s); and
   (f) iteratively repeating from step (c), thereby labelling, for each iteration, one or more others of the unlabelled images of the plurality of unlabelled images so as to increase the number of labelled images contained in the one or more atlases.

2. The method as claimed in claim 1, wherein the step of comparing the labelled and unlabelled images comprises embedding the images into a low-dimensional coordinate system.

3. The method as claimed in claim 2, wherein the low-dimensional coordinate system is a two-dimensional coordinate space.

4. The method as claimed in claim 1, wherein the step of comparing the labelled and unlabelled images comprises defining a set of pairwise measures of similarity by comparing one or more respective anatomical features for each pair of images in the set of images.

5. The method as claimed in claim 4, wherein the step of comparing the labelled and unlabelled images further comprises performing a spectral analysis operation on the pairwise measures of similarity.

6. The method as claimed in claim 4, wherein the pairwise measures of similarity represent the intensity similarity between a pair of images.

7. The method as claimed in claim 4, wherein the pairwise measures of similarity represent the amount of deformation between a pair of images.

8. The method as claimed in claim 1, wherein the step of propagating label data comprises propagating label data from a plurality of the closest of the labelled images, based on a classifier fusion technique.

9. The method as claimed in claim 1, further comprising, after step (e) and before step (f), a step of performing an intensity-based refinement operation on the newly-propagated label data.

10. The method as claimed in claim 1, wherein the images are of different subjects.

11. The method as claimed in claim 1, wherein at least some of the images are of the same subject but taken at different points in time.

12. The method as claimed in claim 1, wherein the images are magnetic resonance images.

13. The method as claimed in claim 1, further comprising labelling an anatomical feature representative of the presence or absence of a condition and using that feature to derive a biomarker for that condition.

14. The method as claimed in claim 13, further comprising allocating a subject to a diagnostic category on the basis of the biomarker.

15. The method as claimed in claim 13, further comprising quantifying a subject's response to treatment on the basis of the biomarker.

16. The method as claimed in claim 13, further comprising selecting a subject's treatment on the basis of the biomarker.

17. A system, comprising:
a processor; and
a memory storing instructions thereon, wherein the instructions when executed cause the processor:
  to obtain at least one atlas containing at least one image, the at least one image is characterized in that it is composed of a plurality of voxels wherein at least some of the voxels correspond to one or more anatomical features labeled with label data;
  to obtain a plurality of unlabelled images each composed of a respective plurality of voxels;
  to compare the at least one image having one or more anatomical features labeled with label data and the plurality of unlabelled images, resulting in a comparison;
  based on the comparison, to select at least one of the plurality of unlabelled images that most closely resembles the at least one image having one or more anatomical features labeled with label data;
  to propagate label data from the at least one image having one or more anatomical features labeled with label data from the at least one closest labeled image to each of the selected unlabelled image, so that when the corresponding anatomical feature(s) of each of the selected image(s) become labelled, the selected images(s) become labelled image(s); and
  to iteratively repeat for each of the selected unlabelled images, thereby labelling, for each iteration, one or more others of the unlabelled images of the plurality of unlabelled images so as to increase the number of labelled images contained in the at least on atlas.

18. The system of claim 17, wherein the system is a medical scanner.

19. The system of claim 18, wherein the system is an MRI scanner.

20. A non-transitory computer readable medium having instructions thereon that, when executed, perform operations comprising:
  (a) obtaining one or more atlases containing one or more images, the one or more images are characterized in that they are composed of a plurality of voxels wherein at least some of the voxels correspond to one or more anatomical features that have been labelled with label data;
  (b) obtaining a plurality of unlabelled images each composed of a respective plurality of voxels;
  (c) comparing the one or more labelled images and each unlabelled image of the plurality of unlabeled images, resulting in a comparison;
  (d) based on the comparison, selecting one or more unlabelled images that most closely resemble(s) one or more of the labelled images;
  (e) propagating label data of the one or more labelled anatomical features from the one or more closest of the labelled images to each of the selected one or more unlabelled images, so that when the corresponding anatomical feature(s) of each of the selected images(s) become labelled, the selected image(s) become labelled image(s); and
  (f) iteratively repeating from step (c), thereby labelling, for each iteration, one or more others of the unlabelled images of the plurality of unlabelled images so as to increase the number of labelled images contained in the one or more atlases.

* * * * *